(12) United States Patent
Schneider et al.

(10) Patent No.: US 7,668,690 B2
(45) Date of Patent: Feb. 23, 2010

(54) SYSTEM AND METHOD FOR DETERMINING POSITION OR SPEED OF A COMMUTATED DC MOTOR WITH ERROR CORRECTION

(75) Inventors: Philip K. Schneider, El Paso, TX (US); Salvador A. Canales, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 12/152,302

(22) Filed: May 14, 2008

(65) Prior Publication Data

US 2009/0254300 A1    Oct. 8, 2009

Related U.S. Application Data

(60) Provisional application No. 61/043,266, filed on Apr. 8, 2008.

(51) Int. Cl.
 G01P 3/44 (2006.01)
 G01R 23/10 (2006.01)
 G01R 23/15 (2006.01)

(52) U.S. Cl. .................. 702/145; 318/470; 702/78; 702/151

(58) Field of Classification Search .......... 702/64, 702/72, 78, 142, 145, 151; 701/36; 318/77, 318/470, 565, 567
See application file for complete search history.

(56) References Cited

U.S. PATENT DOCUMENTS

| | | | |
|---|---|---|---|
| 5,497,326 A | 3/1996 | Berland et al. | |
| 6,144,179 A | 11/2000 | Kessler et al. | |
| 6,456,028 B2 * | 9/2002 | Aoki et al. | 318/470 |
| 6,559,616 B2 * | 5/2003 | Aoki et al. | 318/567 |
| 6,839,653 B2 * | 1/2005 | Gerlach | 702/151 |
| 6,845,337 B2 | 1/2005 | Gerlach | |

(Continued)

FOREIGN PATENT DOCUMENTS

DE    10124615    12/2002

(Continued)

OTHER PUBLICATIONS

"How Temperature Affects a Servomotor's Electrical and Mechanical Time Constants," Richard H. Welsh Jr. and George W. Younkin, IEEE © 2002 Publication 0-7803-7420-7/02, pp. 1041-1046.

(Continued)

*Primary Examiner*—John H Le
(74) *Attorney, Agent, or Firm*—Jimmy L. Funke

(57) ABSTRACT

A motor control system and method are provided for detecting current ripple in a commutated DC motor and further determining position and speed of the motor based on the detected ripple current. Ripples in the motor current are detected and a ripple frequency is calculated based on the time between successive ripples. A ripple count between successive frequencies is determined and the ripple count is compared to a threshold value, and an estimated ripple frequency is determined from a motor model when the ripple count exceeds the threshold value. A corrected ripple count is calculated from a ratio of the calculated ripple frequency and the estimated ripple frequency, and motor position and motor speed are determined based on the corrected ripple count.

20 Claims, 4 Drawing Sheets

U.S. PATENT DOCUMENTS

| | | |
|---|---|---|
| 2004/0027264 A1 | 2/2004 | Otte |
| 2004/0107071 A1 | 6/2004 | Gerlach |
| 2004/0111233 A1 | 6/2004 | Gerlach |
| 2007/0075656 A1 | 4/2007 | Moller et al. |
| 2008/0272726 A1 | 11/2008 | Buhlheller et al. |

FOREIGN PATENT DOCUMENTS

| | | |
|---|---|---|
| DE | 202004010211 | 8/2005 |
| EP | 1659683 | 5/2006 |
| EP | 1772954 | 4/2007 |

OTHER PUBLICATIONS

"DC Motors and Control Systems," Edited by Benjamin C. Kuo and Jacob Tal © 1978, 3 pages.

European Search Report dated Jul. 1, 2009.

* cited by examiner

SYSTEM AND METHOD FOR DETERMINING POSITION OR SPEED OF A COMMUTATED DC MOTOR WITH ERROR CORRECTION

CROSS-REFERENCE TO RELATED APPLICATION

This application claims the benefit under 35 U.S.C. 35 U.S.C. §119(e) of U.S. Provisional Patent Application No. 61/043,266, filed on Apr. 8, 2008, the entire disclosure of which is hereby incorporated herein by reference.

TECHNICAL FIELD

The present invention generally relates to a method for detecting ripple current in a commutated DC motor, and more particularly relates to determining position and/or speed of the motor based on the detected ripple current.

BACKGROUND OF THE INVENTION

Commutated direct current (DC) motors have an armature current signal that generally includes a DC current signal and an alternating current (AC) signal in the form of current ripples which are the current peaks contained in the motor armature current signal that occur when the armature of the motor rotates. Ripple counting is a well recognized technique that utilizes the AC portion of the armature current signal caused by the commutation process to determine the position and/or speed of the commutated DC motor. By counting the number of commutation pulses in the armature current signal, the rotational position and speed of the motor can be determined, without requiring additional sensor components.

Distortion can arise in the ripple current signal due to rotor (armature) eccentricity, brush seating, magnetic saturation, pulse-width modulation (PWM) of the armature voltage, torque ripple, external mechanical load and other effects which can result in missed or extra ripple counts. In order to detect accurate position and/or speed of the motor, any missed or extra ripple counts should be accounted for. A number of approaches have been proposed to correct for errors in ripple counting, however, conventional approaches are generally inefficient as they typically require additional calculation of motor speed or are based on a premise that injects inaccuracy into the ripple count determination.

Accordingly, it is desirable to provide for an enhanced approach for detecting ripple count and determining rotational position and/or speed of a commutated DC motor that effectively and efficiently accounts for any errors that may otherwise occur in the ripple count so as to provide for a system that does not need additional costly sensors.

SUMMARY OF THE INVENTION

In accordance with one aspect of the present invention, a method is provided for determining rotational position or speed of a mechanically commutated DC motor from motor current ripple due to commutation. The method includes the steps of monitoring motor current of a mechanically commutated DC motor and detecting ripples in the motor current. The method also includes the steps of calculating a ripple frequency based on the time between two successive ripples and determining a ripple count between successive frequencies. The method also includes the steps of comparing the ripple count to a threshold value and determining an estimated ripple frequency from a motor model when the ripple count exceeds the threshold value. The method further includes the steps of calculating a corrected ripple count from a ratio of the calculated ripple frequency and the estimated ripple frequency, and determining at least one of motor position and motor speed based on the corrected pulse count.

According to another aspect of the present invention, a method for determining ripple count of a mechanically commutated DC motor from the motor current ripple due to commutation is provided. The method includes the steps of monitoring motor current of a mechanically commutated DC motor, and detecting ripples in the motor current. The method also includes the steps of calculating a ripple frequency based on time between two successive ripples, determining a ripple count between two successive frequencies, and comparing the ripple count to a threshold value. The method further includes the steps of determining an estimated ripple frequency from a motor model when the ripple count exceeds the threshold value, and calculating a corrected ripple count from the ratio of the calculated ripple frequency and the estimated ripple frequency.

According to a further aspect of the present invention, a detection system is provided for determining rotational position and/or speed of a mechanically commutated DC motor from motor current ripple due to commutation. The system includes a current sensor for sensing current of a mechanically commutated DC motor. The system also includes a processor for processing the sensed motor current to detect a motor ripple count and determining at least one of rotational position and speed of the motor. The processor detects ripples in the sensed motor current, calculates a ripple frequency based on time between two successive ripples, and determines a ripple count between two successive frequencies. The processor also compares the ripple count to a threshold value, determines an estimated ripple frequency from a motor model when the ripple count exceeds the threshold value, calculates a corrected ripple count from a ratio of the calculated ripple frequency and the estimated ripple frequency, and determines at least one of motor position and motor speed based on the corrected ripple count.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
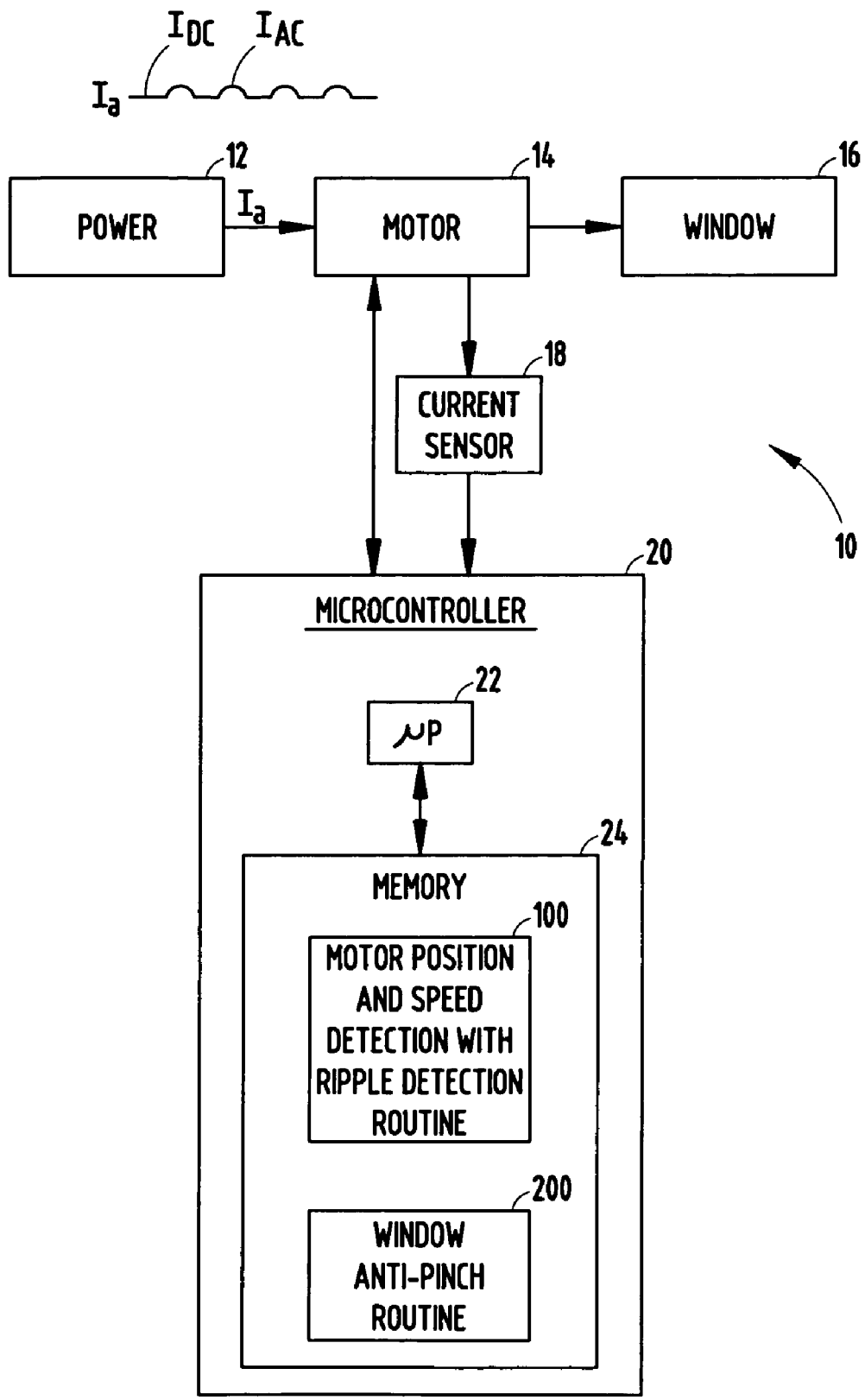
FIG. 1 is a block diagram illustrating a vehicle power window control system employing a ripple detection and motor position and speed determination routine according to one embodiment the present invention.

Referring now to FIG. 1, a motor control system 10 is generally illustrated for controlling a motor driven power window 16, according to one embodiment. The motor driven power window 16 may be employed onboard a vehicle, such as an automobile. The motor control system 10 controls an electric motor 14 responsive to user actuation of a switch (not shown) to actuate the window up (close) and down (open) and further monitors position and speed of the motor 14. The motor control system 10 executes a motor position and speed detection with ripple detection routine 100 and operates as a detection system to determine rotational position and speed of the motor 14. The motor control system 10 is shown further having a window anti-pinch routine 200 to prevent closing the window 16 on an object. It should be appreciated that the motor 14 may drive any of a number of actuated devices including, but not limited to, electric powered windows, sunroofs, seats, and other power devices.

The motor 14 is a mechanically commutated direct current (DC) motor which receives electrical power from a power source 12 and has a motor with an output shaft that rotates to drive (actuate) the actuated device, such as power window 16. The commutated DC motor 14 has an armature current signal $I_a$ that generally includes a direct current (DC) component $I_{DC}$ and a ripple component $I_{AC}$ which occurs as a consequence of the magnetic field, the armature winding, and the commutator of the DC motor 14. Peaks in the current signal of the ripple component occur when the armature rotates, and the current ripple generally has a frequency corresponding to the number of commutator segments of the armature. Thus, the number of current ripples present in the current ripple component $I_{AC}$ indicates the rotational position of the armature of the DC motor 14 and may also be used to determine the speed of the motor 14.

The control system 10 is further illustrated including a current sensor 18 and a microcontroller 20. The current sensor 18 senses an electric current including the ripple component $I_{AC}$ of current in the motor 14. Additionally, voltage of the motor 14 may be input to the microcontroller 20, and the microcontroller 20 may provide control signals back to the motor 14 to control activation of the motor 14 and hence actuation of the window 16. The microcontroller 20 may include any control circuitry capable to processing sensed signals and routines, including routine 100 as described herein to detect current ripple and determine motor position and speed. According to one embodiment, the microcontroller 20 includes a microprocessor 22 and memory 24. Memory 24 may include any volatile or non-volatile memory including, but not limited to, read-only memory (ROM), random access memory (RAM), electrically erasable programmable read-only memory (EEPROM), and flash memory. Stored within memory 24 are a plurality of routines including a motor position and speed detection and ripple detection routine 100 for detecting current ripple and further determining position and speed of the motor 14, according to one embodiment of the present invention. Additionally, a window anti-pinch routine 200 is also shown stored in memory 24 for controlling the window so as to prevent closure when an obstruction is present. It should be appreciated that routine 200 may include a conventional anti-pinch routine and that other routines may be stored in memory 24 and executed by the microprocessor 22. It should further be included that the microcontroller 20 may be a stand alone controller or may be integrated with other control circuitry.

The microcontroller 20 controls the activation of the motor 14 responsive to a user input (not shown) such as a window switch. In doing so, electric current $I_a$ passes through the motor 14 to rotate the armature and output shaft which in turn actuates the window 16. The current $I_a$ includes the direct current component $I_{DC}$ and the ripple component $I_{AC}$ which is present when the motor 14 rotates. The current sensor 18 senses the current $I_a$ including the ripple component $I_{AC}$ and inputs the sensed current $I_a$ including the ripple current $I_{AC}$ to the microcontroller 20 which, in turn, processes the sensed motor current including the detected ripples to determine an accurate ripple count, and further determines motor position and speed as explained herein.

Figure 2:
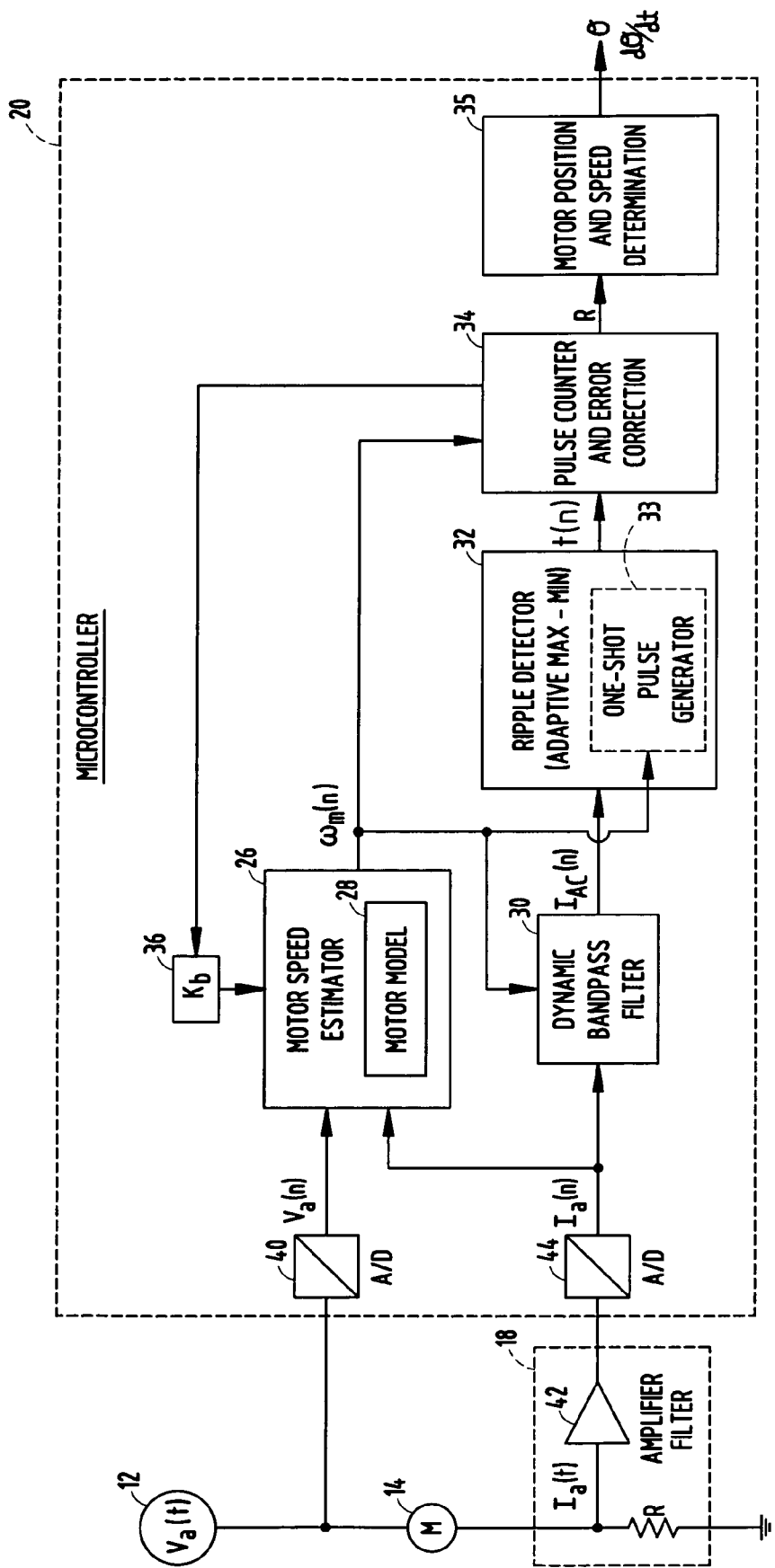
FIG. 2 is a circuit/block diagram further illustrating the control system as shown in FIG. 1.

Referring to FIG. 2, the motor control system 10 is further illustrated having a power source 12 supplying a DC voltage $V_a(t)$, such as twelve volts, to a direct current (DC) motor 14. The voltage $V_a(t)$ that is applied to the motor 14 is also input to an analog-to-digital (A/D) converter 40 in the microcontroller 20 to convert the analog voltage to a digital voltage. Additionally, the current sensor 18 senses the current $I_a(t)$ passing through the motor 14 which is input to an analog-to-digital (A/D) converter 44 in microcontroller 20 to convert the analog current $I_a(t)$ to a digital voltage representing the motor current. The current sensor 18 is shown made up of a resistor R and amplifier filter 42. Both the digital sensed voltage $V_a(n)$ and current $I_a(n)$, which is represented as a sensed voltage, are input to a motor speed estimator 26 which also receives a motor constant $K_b$ at block 36. The motor speed estimator 26 includes a motor model 28 that models the electrical characteristics of the DC motor 14. The motor speed estimator 26 essentially estimates the rotational speed $\omega_m$ of the motor, according to one embodiment.

The digital sensed current $I_a$ is also input to a dynamic bandpass filter 30 which filters the sensed current to filter out the DC current component $I_{DC}$ and to allow the AC portion of the current indicative of ripple events to pass therethrough as ripple current $I_{AC}$ which is input to a ripple detector 32. The dynamic bandpass filter 30 has a center frequency that is dynamically adapted to the motor ripple frequency, which enhances the ripple featuring both transient and steady state operating conditions. The ripple detector 32 performs an adaptive max-min function to detect ripple events. One example of a ripple detector performing a max-min function is disclosed in U.S. Patent Application Publication No. 2007/0075656 A1, now U.S. Pat. No. 7,474,068, the entire disclosure of which is hereby incorporated herein by reference. The max-min function performs detection of the local maximum and minimum levels of the filtered motor ripple current $I_{AC}$ and the difference between the maximum and minimum levels is multiplied by a coefficient to form an adaptive threshold reference input to a comparator.

Included in ripple detector 32 is a one-shot pulse generator 33 which also receives the estimated motor speed signal $\omega_m(n)$. The filtered current waveform is compared with the reference input to generate a trigger to the one-shot generator 33 representing a ripple count. The period of the one-shot generator 33 is proportional to the ripple frequency, which adds dynamic blanking to mask extra pulses. Upon detection of a ripple event, a trigger is generated to the one-shot pulse generator 33 to mark the time point of commutation $t(n)$.

The ripple detector 32 outputs the time signal $t(n)$ at which time ripple events are detected which are input to a pulse counter and error correction block 34. The pulse counter and error correction block 34 counts the number of pulses and evaluates the period fluctuation (ripple) of the motor current due to the commutation process and performs an error correction scheme based on an evaluation of the ripple count between successive frequency calculations using the present and previous time points of commutation ($t_n$, $t_{n-1}$, $t_{n-2}$) and outputs a ripple count R. One example of a ripple detector that detects ripple and error is disclosed in European Patent Application No. EP 08003472, filed on Feb. 26, 2008, now European Patent Publication No. EP 2096414 A1, the disclosure of which is hereby incorporated herein by reference. The ripple count R is provided as an input to the motor position and speed determination block 35 which determines motor position θ and motor speed dθ/dt, both of which are provided as outputs.

Figure 3:
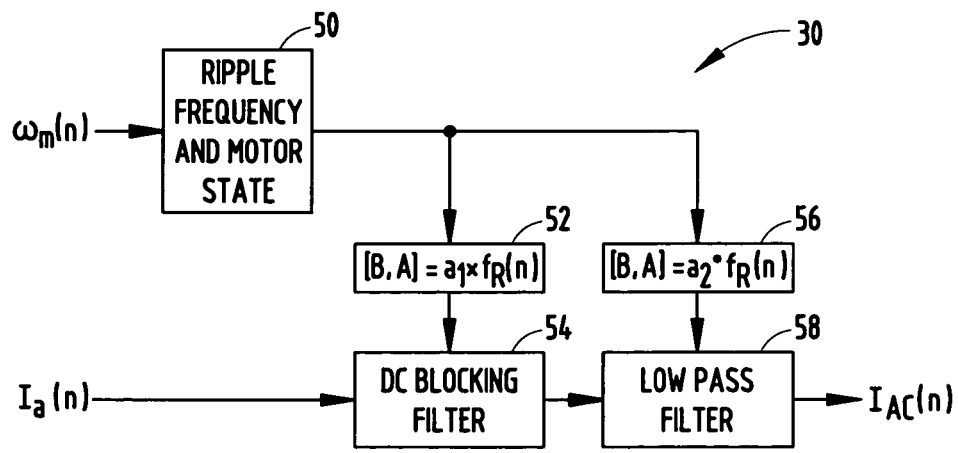
FIG. 3 is a block diagram further illustrating the filter and ripple detection circuitry, according to a first embodiment.

The dynamic bandpass filter 30 is further illustrated in more detail in FIG. 3, according to a first embodiment. Filter 30 includes a ripple frequency and motor state block 50 for receiving the estimated motor rotational speed $\omega_m$ and providing the ripple frequency and motor state as outputs to blocks 52 and 56. Block 52 multiplies the ripple frequency by a constant $a_1$, while block 56 multiplies the ripple frequency by a constant $a_2$. Constant $a_1$ represents the index for selection of the high pass filter coefficients in filters 54 and 58 so that the cut-on frequency is a percentage above the ripple frequency. Constant $a_2$ represents the index for the selection of the low pass filter 58 coefficients so that the cut-off frequency is a percentage below the ripple frequency. The output of block 52 is provided along with the digital sensed current $I_a$ to a DC blocking filter 54 which filters out the DC current component such that the AC current $I_{AC}$ with ripple signals pass therethrough. The output of DC blocking filter 54 is input to a low pass filter 58 along with the output of block 56 to provide the filtered AC component of the ripple current $I_{AC}$.

Figure 4:
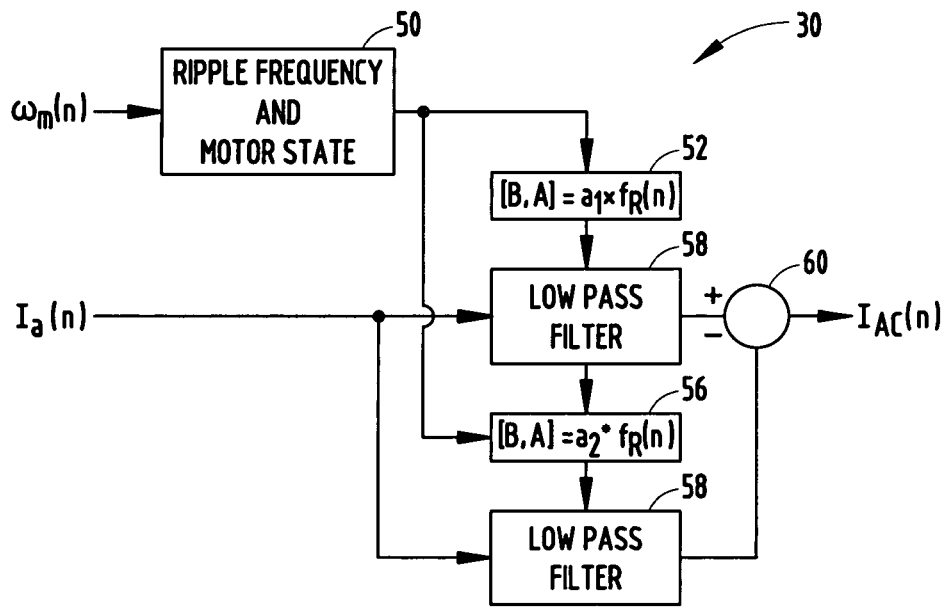
FIG. 4 is a block diagram illustrating the filter and ripple detection circuitry, according to a second embodiment.

The dynamic bandpass filter 30 may alternately be implemented as shown in FIG. 4, according to a second embodiment. In this embodiment, the output of block 52 is provided as an input to a low pass filter 58, and the output of block 56 is input to another low pass filter 58. The difference between the outputs of the low pass filters 58 is computed in summing block 60, and the difference output provides for the filtered AC component of ripple current $I_{AC}$.

Figure 5:
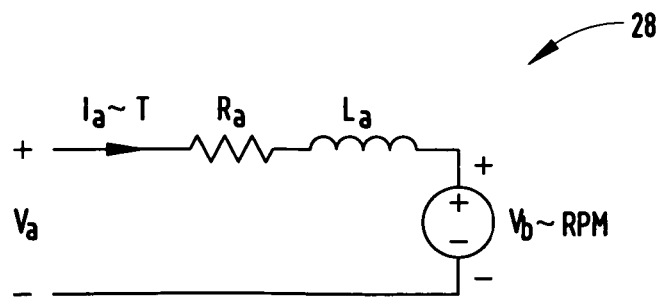
FIG. 5 is a circuit diagram illustrating a motor model, according to one embodiment.

When the control system 20 determines that it is probable that ripple detection error has occurred, it switches to a motor state model 28, shown in one embodiment provided in the motor speed estimator 26. The motor model 28 uses a speed dependent motor voltage $V_b$ to estimate the ripple frequency, where a ratio based on the motor model estimate of the ripple frequency and the actual calculated ripple frequency are evaluated to determine the number of ripple counts that should have been detected. The circuit shown in FIG. 5 represents a motor model 28, according to one embodiment. The speed and rotational position of the DC motor can be calculated from the measured armature voltage and current estimated with knowledge of the motor constants using electromechanical equations of a DC motor. The motor armature is modelled electrically as a series circuit combination of inductance $L_a$ and resistance $R_a$ and a speed dependent voltage source $V_b$. The mechanical portion of the model includes a rotating mass with moment of inertia $J_m$ and a viscous damping force $B_m$. Motor torque $T_m$ may be represented by a torque constant $K_t$ multiplied by the armature current $I_a$. The back EMF voltage $V_b$ may be equal to the product of the electrical back EMF constant $K_b$ and the rotational velocity $\omega_m$. Using the simplified motor electrical equation, where inductance of the armature $L_a$ is assumed to be zero, the motor rotational velocity $\omega_m$ may be represented by:

$$\omega_m = \frac{V_b}{K_b} = \frac{V_a - I_a R_a}{K_b}$$

The commutation ripple frequency in hertz can be calculated by the following equation:

$$f_R = \left(\frac{n}{60}\right)N = \left(\frac{\omega_m}{2\pi}\right)N,$$

Where n is speed (revs/min) and N represents the number of commutations per revolution of the motor. The commutation ripple frequency is essentially equal to the frequency of the motor multiplied by the number of commutations per revolution.

The control system 10 and method 100 of the present invention advantageously determine the ripple count and provide for error correction in a manner that is efficient and robust. In doing so, the AC current signal $I_{AC}$ is extracted from the DC component $I_{DC}$ of the current signal $I_a$ to get sufficient resolution of the ripples. The AC current signal $I_{AC}$ is separated from the DC portion of the current signal using the dynamic bandpass filter whose center frequency is dynamically adapted to the motor ripple frequency $f_R$. This significantly enhances the ripple feature during both transient and steady state operations. Upon detection of a ripple event, a trigger is generated by the one-shot pulse generator to mark the time point of commutation $t_n$. It should be appreciated that errors may arise due to limitations in the commutation ripple detection method, noise on the supply line from other loads, or from distortion in the ripple waveform due to motor parameter variation or the state of operation, such as starting, braking, assist load or stall condition. The method and system of the present invention advantageously corrects for such errors in the ripple count.

Figure 6:
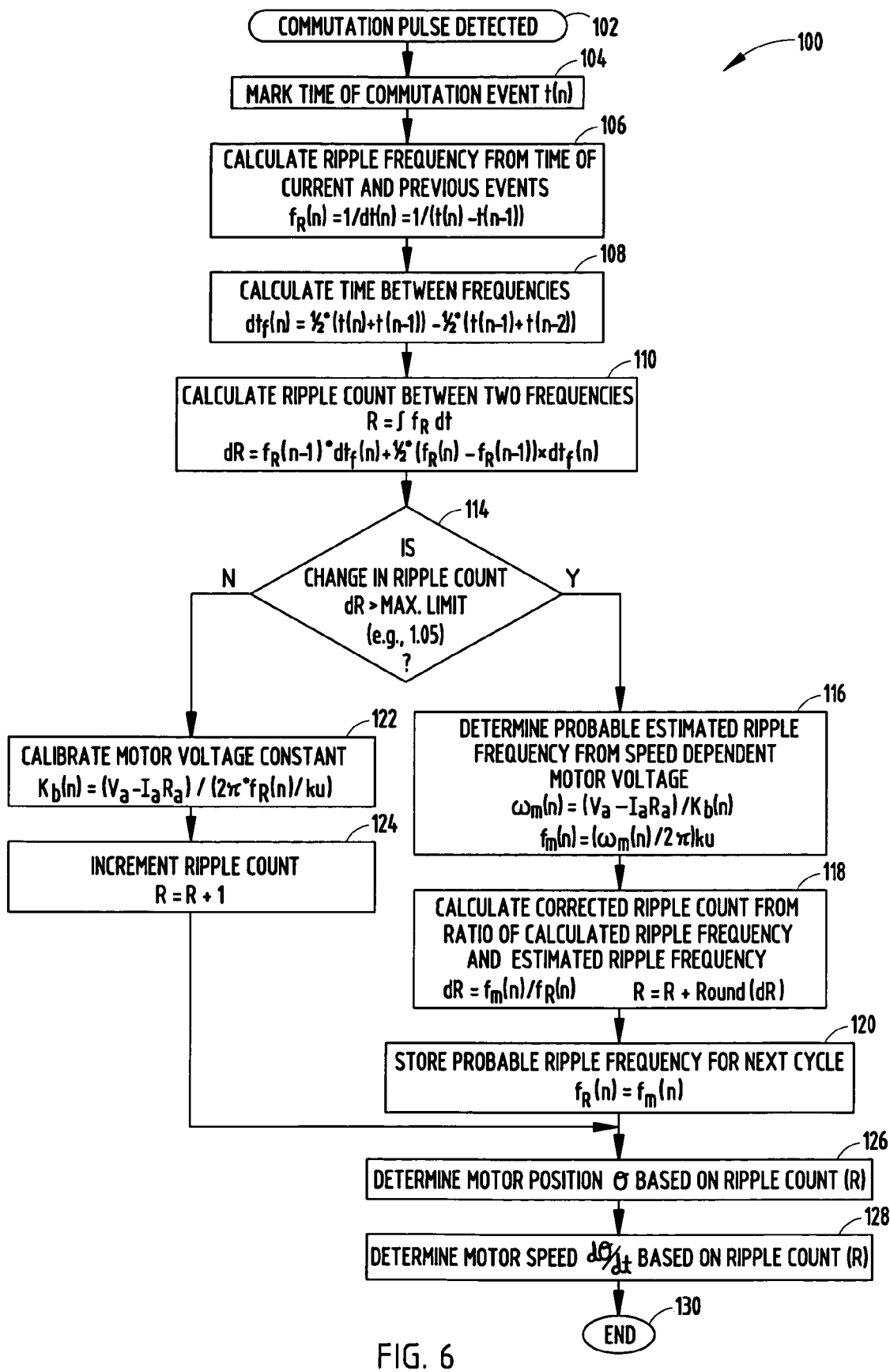
FIG. 6 is a flow diagram illustrating a routine for detecting ripple count and rotational position and speed of the motor, according to one embodiment of the present invention.

Referring to FIG. 6, the motor position and speed detection with ripple detection routine 100 is illustrated, according to one embodiment. Routine 100 determines the ripple count and further determines the position of the motor and the speed of the motor. Routine 100 begins at step 102 to detect each commutation pulse of the motor. Next, in step 104, the time of the commutation event is marked. Next, the ripple frequency $f_R(n)$ is calculated from the time of the current event t(n) and the previous events t(n-1) as shown in step 106. The frequency of the ripple $f_R$ is generally equal to 1 divided by dt, where dt is the time between the ripples.

Proceeding to step 108, routine 100 calculates the time between successive calculated frequencies, shown as $dt_f(n)$. The time between successive calculated frequencies is determined by first calculating ripple frequency from the current event n at time t(n) and the previous event n-1 at time t(n-1), and the ripple frequency calculated from the previous time event t(n-1) and the next prior event t(n-2). Next, the ripple count R between the two frequencies is calculated in step 110. The ripple count R is computed as the integral of $f_R dt$, such that the change in the ripple count dR between the two successive frequencies can be computed as shown by the equation in block 110. In decision step 114, the change in ripple count dR is compared to a threshold value shown as maximum limit (e.g., 1.05). It should be appreciated that if the ripple timing is correct, the result of the pulse count should result in dR being close to 1.00, such that dR is between 0.95 and 1.05 and the ripple count is incremented. Other threshold value may be employed according to other embodiments. If the change in ripple count dR is not greater than the maximum limit, then routine 100 proceeds to calibrate the motor voltage constant $K_b(n)$ in step 122, and then increments the pulse count R pulse count R=R+1 in step 124.

If the ripple count error dR is determined to be greater than the maximum limit of 1.05 in step 114, routine 100 proceeds to step 116 to determine a probable estimated ripple frequency from the speed dependent motor voltage. The estimated ripple frequency determination from the speed dependent motor voltage is achieved by switching to use of the motor model, such that the ratio of the motor state model estimate of the ripple frequency and the actual calculated ripple frequency are evaluated to determine the number of ripple counts that should have been detected. Next, routine 100 calculates the corrected ripple count from the ratio of the calculated ripple frequency and the estimated ripple frequency in step 118, and then stores the probable ripple frequency for the next cycle in step 120. Given the calculated corrected pulse count R, routine 100 may then proceed to step 126 to determine the motor angular position θ based on the ripple count. Additionally, routine 100 may proceed to step 128 to determine motor angular speed dθ/dt based on the ripple count. Thereafter, routine 100 ends at step 130. It should be appreciated that routine 100 may be periodically repeated or that it may automatically return to the beginning at step 102 following step 130.

Accordingly, the control system 10 and routine 100 advantageously determines ripple count of a mechanically commutated DC motor and efficiently corrects for error in the ripple count to provide for an accurate ripple count. This enables the accurate determination of motor position and motor speed.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A method for determining rotational position or speed of a mechanically commutated DC motor from motor current ripple due to commutation for controlling a motor driven power device, said method comprising the steps of:
    monitoring motor current of a mechanically commutated DC motor with a current sensor;
    detecting ripples in the motor current with a processor;
    calculating a ripple frequency based on time between two successive ripples with the processor;
    determining a ripple count between two successive frequencies with the processor;
    comparing the ripple count to a threshold value with the processor;
    determining an estimated ripple frequency from a motor model stored in a memory when the ripple count exceeds the threshold value;
    calculating a corrected ripple count from a ratio of the calculated ripple frequency and the estimated ripple frequency with the processor; and
    determining, with the processor, at least one of the motor position and the motor speed based on the corrected ripple count.

2. The method as defined in claim 1, wherein the step of detecting ripples further comprises comparing the motor current to a dynamic threshold with the processor, wherein the dynamic threshold is a percentage difference between local maximum and minimum values of the motor current.

3. The method as defined in claim 1, wherein the method further comprises a step of calculating, with the motor model, an estimated motor speed, and wherein the estimated ripple frequency is calculated based on the estimated motor speed.

4. The method as defined in claim 3, wherein the method further comprises a step of comparing, with the processor, the ratio of the calculated ripple frequency and the estimated ripple frequency to determine the number of ripple counts that should have been detected.

5. The method as defined in claim 1, wherein the motor model is a speed dependent motor voltage.

6. The method as defined in claim 1, wherein the method further comprises a step of calculating, with a processor, a time between two frequencies, wherein the ripple count is determined based on the calculated time.

7. The method as defined in claim 1, wherein the motor is employed to drive a window.

8. A method for determining ripple count of a mechanically commutated DC motor from the motor current ripple due to commutation for controlling a motor driven power device, said method comprising the steps of:
    monitoring motor current of a mechanically commutated DC motor with a current sensor;
    detecting ripples in the motor current with a processor;
    calculating a ripple frequency based on time between two successive ripples with the processor;
    determining a ripple count between two successive frequencies with the processor;
    comparing the ripple count to a threshold value with the processor;
    determining an estimated tipple frequency from a motor model stored in a memory when the ripple count exceeds the threshold value; and
    calculating a corrected ripple count from a ratio of the calculated ripple frequency and the estimated ripple frequency with the processor.

9. The method as defined in claim 8, wherein the step of detecting ripples further comprises comparing the motor current to a dynamic threshold with the processor, wherein the dynamic threshold is a percentage difference between local maximum and minimum values of the motor current.

10. The method as defined in claim 8, wherein the method further comprises calculating, with the motor model, an estimated motor speed, and wherein the estimated ripple frequency is calculated based on the estimated motor speed.

11. The method as defined in claim 10, wherein the method further comprises a step of comparing, with the processor, the ratio of the calculated ripple motor frequency estimate and the ripple frequency to determine the number of ripple counts that should have been detected.

12. The method as defined in claim 8, wherein the motor model is a speed dependent motor voltage.

13. The method as defined in claim 8, wherein the method further comprises a step of calculating, with a processor, a time between two frequencies, wherein the calculated ripple count is determined based on the calculated time.

14. A detection system for determining rotational position and/or speed of a mechanically commutated DC motor from motor current ripple due to commutation, said system comprising:
    a current sensor for sensing current of a mechanically commutated DC motor; and
    a processor for processing the sensed motor current to detect a motor ripple count and determining at least one of rotational position and speed of the motor, said processor detecting ripples in the sensed motor current, calculating a ripple frequency based on time between two successive ripples, determining a ripple count between two successive frequencies, comparing the ripple count to a threshold value, determining an estimated ripple frequency from a motor model when the ripple count exceeds the threshold value, calculating a corrected ripple count from a ratio of the calculated ripple frequency and the estimated ripple frequency, and determining at least one of motor position and motor speed based on the corrected ripple count, 15. The detection system as defined in claim 14, wherein said processor detecting ripples includes comparing the motor current to a dynamic threshold, wherein the dynamic threshold is a percentage difference between local maximum and minimum values of motor current.

16. The detection system as defined in claim 14, wherein the motor model calculates an estimated motor speed, and wherein the estimated ripple frequency is estimated based on the estimated motor speed.

17. The detection system as defined in claim 16, wherein the processor further compares the ratio of the calculated ripple frequency and the estimated ripple frequency to determine the number of ripple counts that should have been detected.

18. The detection system as defined in claim 14, wherein the motor model is a speed dependent motor voltage.

19. The detection system as defined in claim 14, wherein the processor further calculates a time between two frequencies, wherein the ripple count is determined based on the calculated time.

20. The detection system as defined in claim 14, wherein the motor is employed to drive a window.

* * * * *